US008789959B2

(12) United States Patent
Shimizu

(10) Patent No.: US 8,789,959 B2
(45) Date of Patent: Jul. 29, 2014

(54) LIGHTING DEVICE, DISPLAY DEVICE AND TELEVISION DEVICE

(75) Inventor: Takaharu Shimizu, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 13/817,691

(22) PCT Filed: Aug. 24, 2011

(86) PCT No.: PCT/JP2011/069024
§ 371 (c)(1),
(2), (4) Date: Feb. 19, 2013

(87) PCT Pub. No.: WO2012/029600
PCT Pub. Date: Mar. 8, 2012

(65) Prior Publication Data
US 2013/0148036 A1    Jun. 13, 2013

(30) Foreign Application Priority Data

Aug. 31, 2010   (JP) ................. 2010-193804

(51) Int. Cl.
F21S 2/00       (2006.01)
G02F 1/13357    (2006.01)
F21V 7/10       (2006.01)
H04N 5/66       (2006.01)

(52) U.S. Cl.
USPC ............ 362/97.1; 362/612; 362/616

(58) Field of Classification Search
USPC ......... 362/97.1, 612, 616; 313/498–512; 445/24–25
See application file for complete search history.

(56) References Cited

U.S. PATENT DOCUMENTS

2008/0297907 A1    12/2008   Howe et al.
(Continued)

FOREIGN PATENT DOCUMENTS

JP    11-260122 A    9/1999
JP    2004-185972 A   7/2004
(Continued)

OTHER PUBLICATIONS

International Search Report corresponding to PCT/JP2011/069024, dated Nov. 22, 2011.

Primary Examiner — Tracie Y Green
(74) Attorney, Agent, or Firm — Lowe Hauptman & Ham, LLP

(57) ABSTRACT

A backlight unit includes a chassis, LED light sources, and a reflection member. The LED light sources are arranged in a matrix on a bottom plate of the chassis. The reflection member includes side wall portions and through holes through which the LED light sources are passed. The side wall portions surround each of the LED light sources passing through the respective through holes. The side wall portions have inclined surfaces on side surfaces thereof that lead light from the LED light sources toward the opening side of the chassis. Each of the side wall portions located between the LED light sources that are adjacently positioned in a diagonal direction has a height greater than a height of each of the side wall portions located between the LED light sources that are adjacently positioned in a vertical direction or in a horizontal direction.

12 Claims, 7 Drawing Sheets

(56) References Cited

U.S. PATENT DOCUMENTS

| | | |
|---|---|---|
| 2011/0001891 A1* | 1/2011 | Yoshikawa .................... 348/790 |
| 2011/0058118 A1* | 3/2011 | Kim ............................... 349/61 |
| 2011/0063850 A1 | 3/2011 | Oide et al. |
| 2012/0224107 A1* | 9/2012 | Mouri ........................... 348/731 |
| 2013/0100648 A1* | 4/2013 | Nozawa ........................ 362/97.2 |
| 2013/0148035 A1* | 6/2013 | Shimizu ........................ 348/739 |
| 2013/0222705 A1* | 8/2013 | Shimizu et al. ............... 348/790 |

FOREIGN PATENT DOCUMENTS

| | | |
|---|---|---|
| JP | 2008-270144 A | 11/2008 |
| JP | 2008-292991 A | 12/2008 |
| JP | 2009-292991 A | 12/2008 |
| JP | 2009-103916 A | 5/2009 |

\* cited by examiner

FIG.1
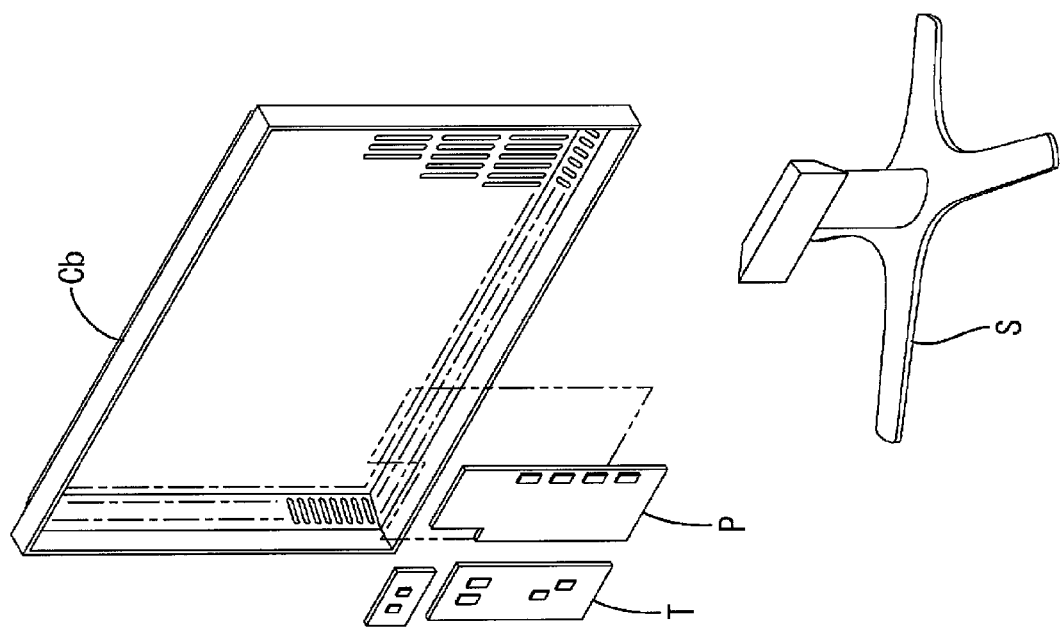
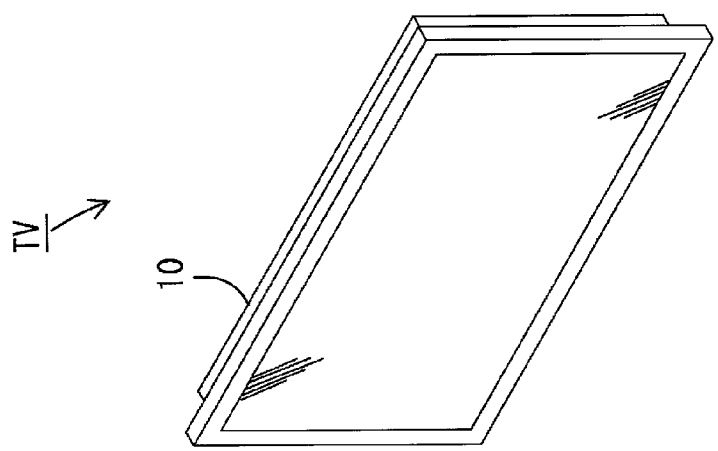
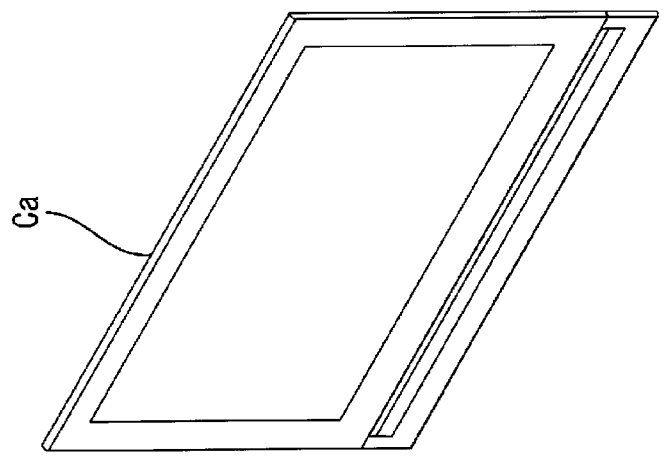

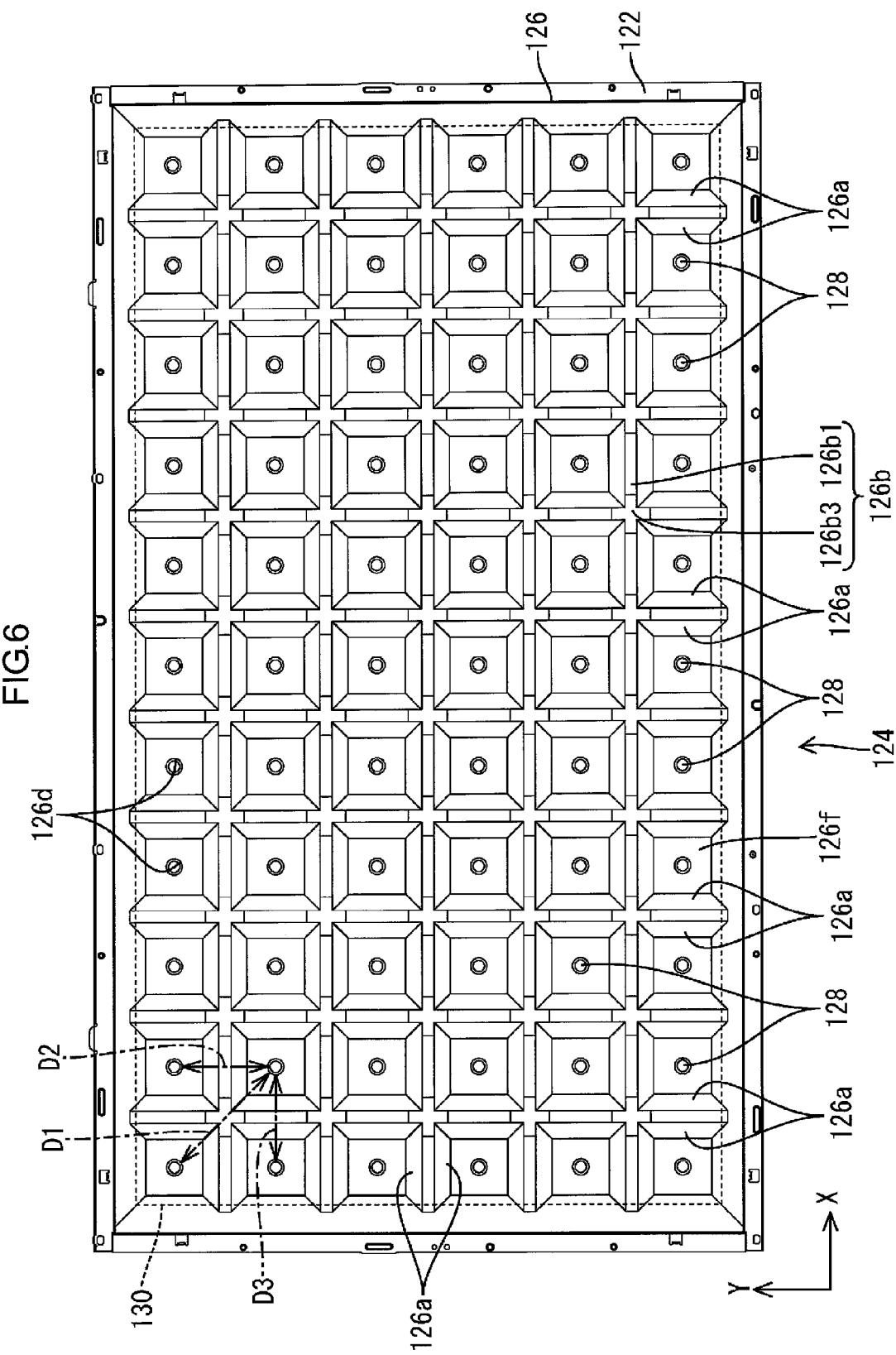

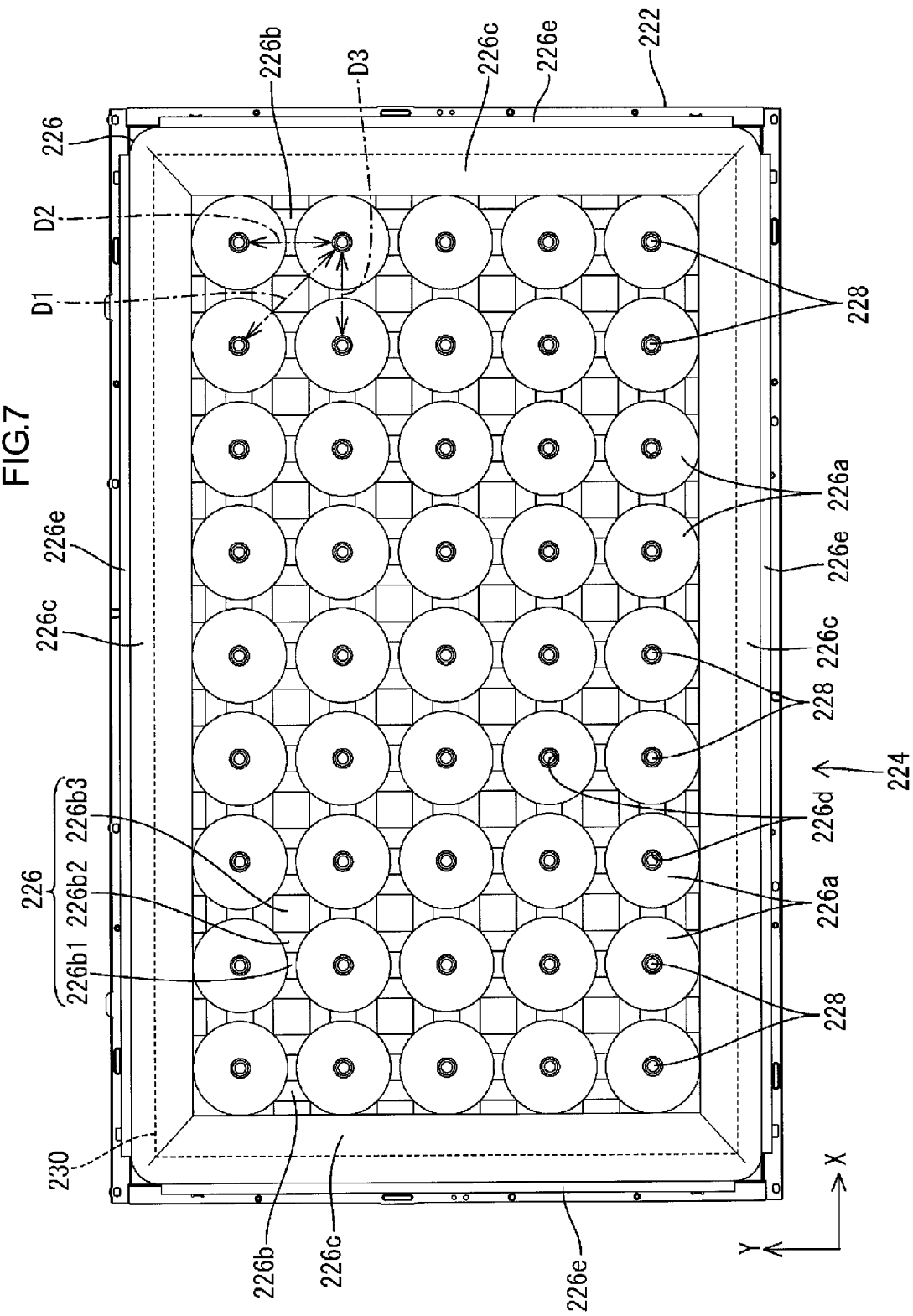

LIGHTING DEVICE, DISPLAY DEVICE AND TELEVISION DEVICE

RELATED APPLICATIONS

The present application is a National Phase of International Application Number PCT/JP2011/069024, filed Aug. 24, 2012, and claims priority from Japanese Application Number 2010-193804, filed Aug. 31, 2010.

TECHNICAL FIELD

The present invention relates to a lighting device, a display device, and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be decreased. Liquid crystal panels included in the liquid crystal display devices do not emit light, and thus backlight devices are required as separate lighting devices.

As the backlight unit, a direct type backlight unit that supplies light directly to a liquid crystal panel from the rear side of the liquid crystal panel is known. In such a backlight unit, a reflection member may be provided on a light source board on which light sources such as LEDs are arranged.

Patent Document 1 discloses a reflection member used in a direct type backlight unit, for example. The reflection member has a three-dimensional shape and includes inclined surfaces. The inclined surfaces incline from the mounting surface, on which the LEDs are mounted, toward the liquid crystal panel. The reflection member further includes a plurality of through holes and side wall portions. The through holes, through which a plurality of LEDs as light sources are individually passed, are evenly distributed in the reflection member. The side wall portions surround each of the LEDs, which are passed through the through holes, with a uniform area size. If such a reflection member is used for the direct type backlight unit including a plurality of LEDs arranged in a matrix, the inclined surfaces of the reflection member can evenly lead light that is emitted from the LEDs toward the liquid crystal panel side. Thus, brightness distribution can be nearly equalized in a display surface of the liquid crystal panel.

RELATED ART DOCUMENT

Patent Document

Patent Document 1: Japanese Unexamined Patent Application Publication No. 2008-292991

Problem to be Solved by the Invention

If the direct type backlight unit including the reflection member disclosed in Patent Document 1 decreases in its thickness, the distance between the LEDs and the display surface also decreases. This increases brightness of parts of the display surface corresponding to the LEDs. The distance between the LEDs that are adjacently positioned in the diagonal direction is greater than the distance between the LEDs adjacently positioned in the vertical or horizontal directions. This relatively lowers the brightness of parts of the display surface that overlap areas between the LEDs adjacently positioned in the diagonal direction. This may cause uneven brightness in the display surface of the liquid crystal panel.

DISCLOSURE OF THE PRESENT INVENTION

This invention was made in view of the above circumstances. It is an object of this invention to provide a technology that hardly causes uneven brightness in a display surface of a direct type lighting device including light sources that are arranged in a matrix and a reflection member that is configured to lead light toward the display surface.

Means for Solving the Problem

A lighting device according to the present invention includes a chassis, a plurality of light sources, and a reflection member. The chassis includes a bottom plate and side plates. The bottom plate has peripheral end portions. The side plates rise from peripheral edge portions toward a first surface side of the bottom plate. The chassis has an opening on the first main surface side. The plurality of light sources are arranged on the first main surface side of the bottom plate of the chassis in a matrix. The light sources are configured to emit light toward an opening side of the chassis. The reflection member has side wall portions and a plurality of through holes through which the respective light sources are passed. The side wall portions surround each of the light sources. Each of the side wall portions has an inclined surface on a side surface thereof. The inclined surface is inclined from a surface on which the light sources are mounted toward the opening side of the chassis. The inclined surface configured to direct light from the light sources toward the opening side of the chassis. The side wall portions located between the light sources that are adjacently positioned in a diagonal direction have a height greater than a height of the side wall portions located between the light sources that are adjacently positioned in a vertical direction or in a horizontal direction with a plan view.

The increase in height of the side wall portions enables the inclined surfaces to extend higher positions, and this leads more light toward the opening side of the chassis. In the above lighting device, the inclined surfaces of the side wall portions located between the light sources that are adjacently positioned in the diagonal direction are formed to a higher position than the inclined surfaces of the side wall portions located between the light sources that are adjacently positioned in the vertical direction or in the horizontal direction. Therefore, more light reaches the inclined surfaces of the side wall portions located between the light sources that are adjacently positioned in the diagonal direction than the inclined surfaces of the side wall portions located between the light sources that are adjacently positioned in the vertical direction or in the horizontal direction. Accordingly, parts of the display surface that overlap areas between the light sources that are adjacently positioned in the diagonal direction can obtain higher brightness than parts of the display surface that overlap areas between the adjacent light sources in the vertical direction or in the horizontal direction. Therefore, uneven brightness is less likely to be caused on the display surface.

The side wall portions located between the light sources that are adjacently positioned in the diagonal direction may have top ends and the top ends may be tapered so as to be narrower toward a center between the light sources that are adjacently positioned in the diagonal direction with a plan view.

With this configuration, brightness can be adjusted with high accuracy in the parts of the display surface that overlap the areas between the adjacent light sources in the diagonal direction. Thus, the brightness is likely to be even on the display surface and the uneven brightness in the display surface is less likely to be caused.

Top ends of the side wall portions that are located between the light sources that are adjacently positioned in the vertical direction or in the horizontal direction may be flat surfaces parallel to the bottom plate of the chassis with a plan view.

This effectively restrains the brightness from becoming excessively high in the parts of the display surface that overlap the areas between the light sources that are adjacently positioned in the vertical direction or in the horizontal direction. Thus, the brightness is likely to be even on the display surface and the uneven brightness in the display surface is less likely to be caused.

The lighting device may further include an optical member through which the light from the light sources passes and arranged on the opening side of the chassis such that a space is provided between the optical member and the top ends of the side wall portions of the reflection member.

With this configuration, the space is provided between the reflection member and the optical member. Thus, the light led toward the opening side of the chassis can be effectively diffused by the optical member. This can enhance the brightness in the display surface.

Each of the light source may have a light intensity distribution in which light having a peak light intensity travels in a direction inclined with respect to a front direction.

This configuration increases a light distribution angle of the light emitted from the light sources. Thus, the amount of rays of light reaching the inclined surface among the rays of light emitted from the light sources increases. This can enhance the brightness in the display surface.

The inclined surface of the reflection member may be inclined with respect to the front direction of the light source at an angle smaller than an angle formed between the light having the peak light intensity and the front direction.

With this configuration, the rays of light having the peak light intensity among the rays of light emitted from the light sources reaches the inclined surface of the reflection member. This can increase the amount of the rays of light led toward the front direction of the light sources among the rays of light emitted from the light sources. Thus, the brightness in the display surface can be further enhanced.

The side wall portions of the reflection member may surround each of the light sources in a grid in a plan view. Thus, the reflection member can obtain high shape-stability.

The light sources may be arranged at regular intervals. With this configuration, the light sources are arranged at regular intervals.

This simplifies mounting work of the light sources to the chassis.

The side wall portions may surround each of the light sources with a uniform area size.

With this configuration, the side wall portions of the reflection member surround each of the LEDs with a uniform area size. Thus, the reflection member can be easily manufactured.

The technology disclosed herein may be embodied as a display device including a display panel configured to display by using light provided by the above lighting device. Further, a display device including a liquid crystal panel using liquid crystals as the display panel has novelty and utility. Furthermore, a television device including the above display device has novelty and utility. The above display device and television can have an increased display area.

Advantageous Effect of the Invention

According to the technology disclosed herein, in the direct type lighting device including the light sources that are arranged in a matrix and the reflection member that is leading light toward the display surface side, uneven brightness is less likely to occur in the display surface.

BRIEF DESCRIPTION OF THE DRAWINGS

FIG. 1 is an exploded perspective view of a television device according to a first embodiment.

FIG. 6 is a plan view of a backlight unit 124 according to a second embodiment.

FIG. 7 is a plan view of a backlight unit 224 according to a third embodiment.

MODE FOR CARRYING OUT THE INVENTION

First Embodiment

A first embodiment will be described with reference to the drawings. An X-axis, a Y-axis, and a Z-axis are illustrated in a part of each drawing. Directions indicated by the axes in each drawing correspond to directions indicated by the respective axes in other drawings. A Y-axis direction corresponds to a vertical direction and an X-axis direction corresponds to a horizontal direction.

FIG. 1 illustrates a television device TV according to the first embodiment in an exploded perspective view. As illustrated in FIG. 1, the television device TV includes a liquid crystal display 10, front and back cabinets Ca and Cb which house the liquid crystal display device 10 therebetween, a power supply P, a tuner T, and a stand S. The liquid crystal display device 10 has a landscape rectangular shape as a whole and held in the vertical position.

Figure 2:
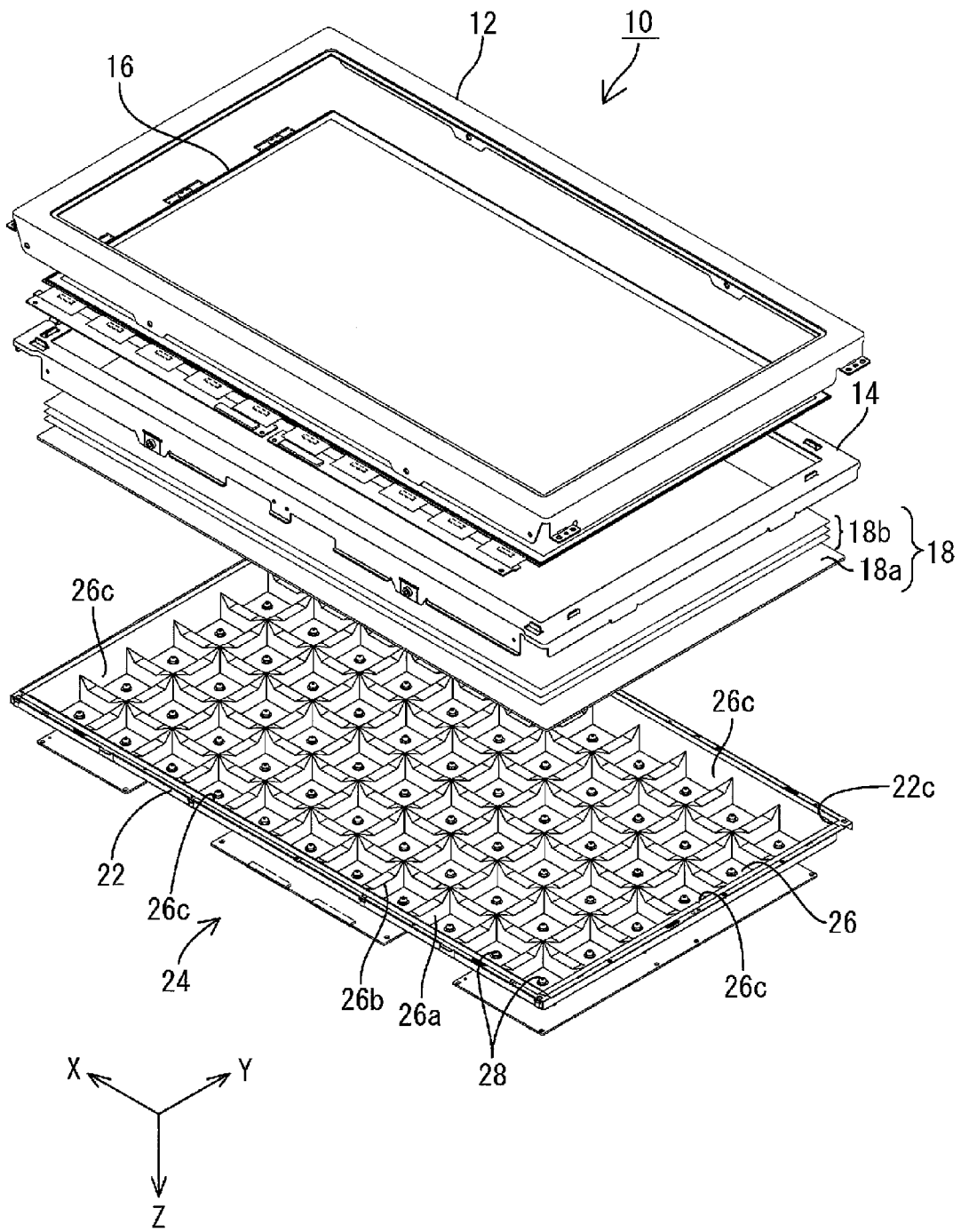
FIG. 2 is an exploded perspective view of a liquid crystal display device 10.

FIG. 2 illustrates the liquid crystal display device 10 in an exploded perspective view. An upper side in FIG. 2 corresponds to a front side, and a lower side therein corresponds to a rear side. As illustrated in FIG. 2, the liquid crystal display device 10 includes a liquid crystal panel 16 as a display panel, and a backlight unit 24 as an external light source. The liquid crystal panel 16 and the backlight unit 24 are integrally held by a frame-shaped bezel 12.

Next, the liquid crystal display panel 16 will be explained. The liquid crystal display panel 16 includes a pair of transparent glass substrates (highly capable of light transmission) and a liquid crystal layer (not illustrated). The glass substrates are bonded together with a predetermined gap therebetween. The liquid crystals are sealed between the glass substrates. On one of the glass substrates, switching components (for example, TFTs) connected to source lines and gate lines which are perpendicular to each other, pixel electrodes connected to the switching components, and an alignment film are provided. On the other glass substrate, color filters having color sections such as red (R), green (G), and blue (B) color sections arranged in a predetermined pattern, counter electrodes, and an alignment film are provided. Image data and control signals that are necessary for displaying an image are sent to the source lines, the gate lines, and the counter electrodes, from a drive circuit board, which is not illustrated. A polarizing plate (not illustrated) is arranged on an outer surface of each of the glass substrates.

Figure 3:
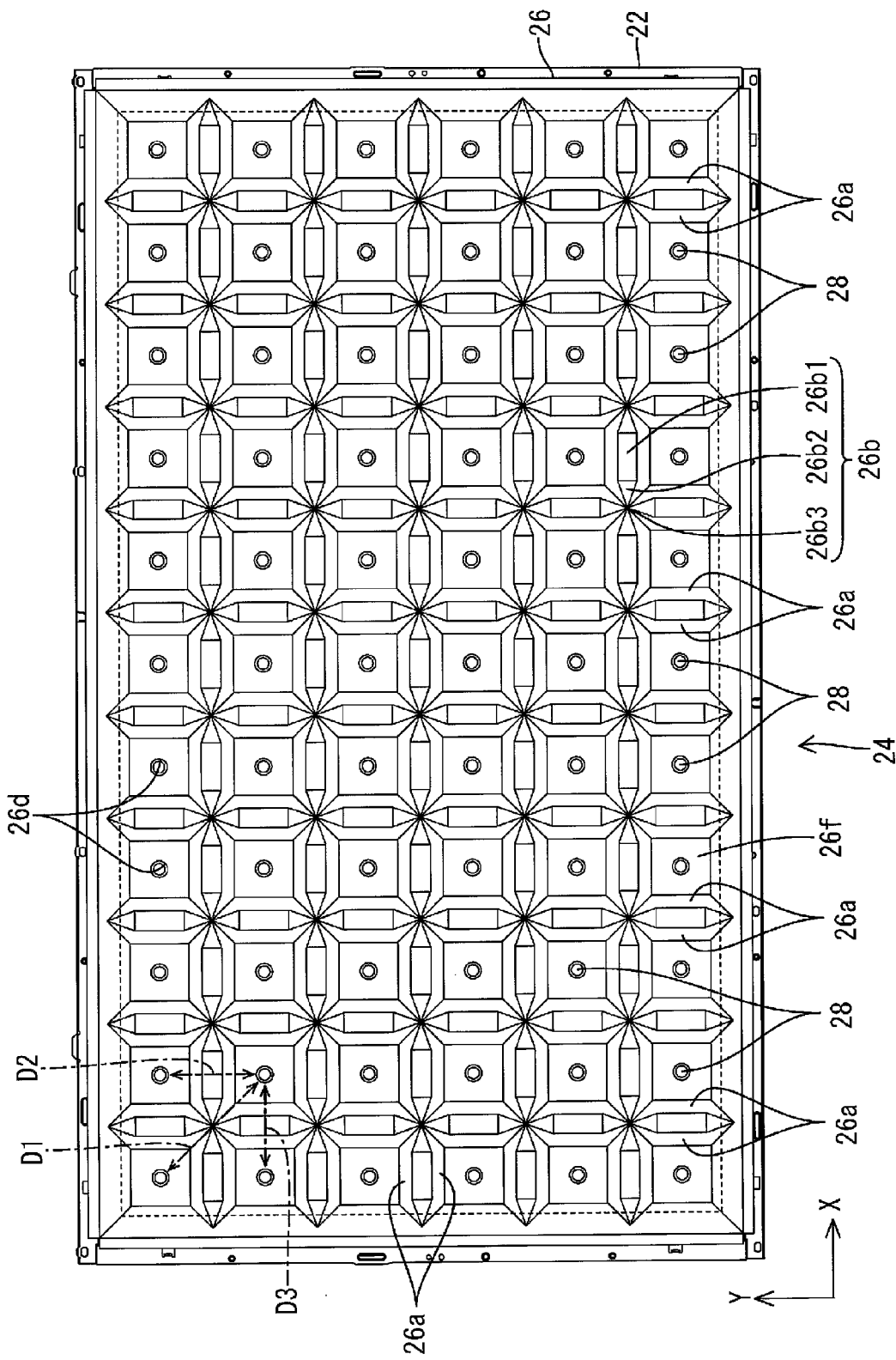
FIG. 3 is a plan view of a backlight unit 24.
Figure 4:
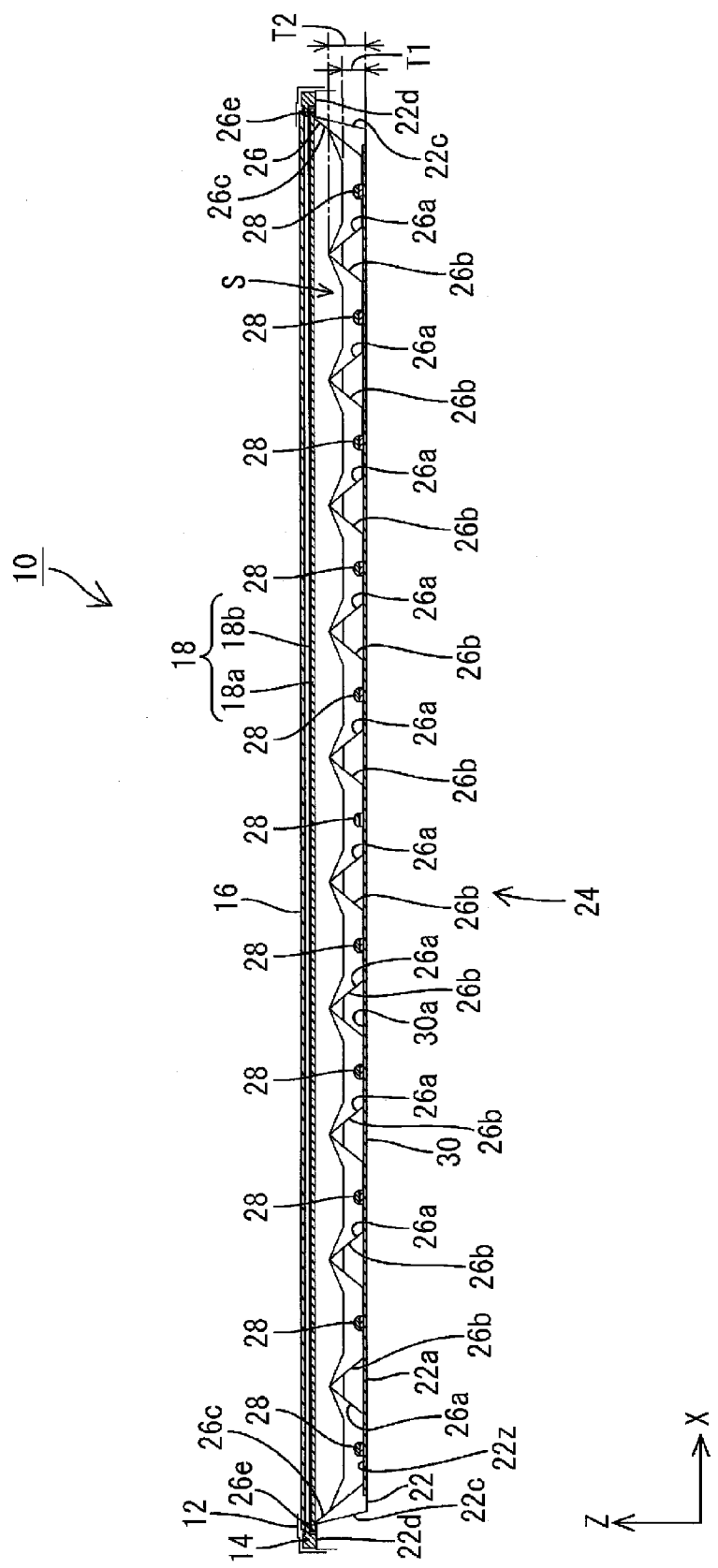
FIG. 4 is a cross-sectional view of the backlight unit 24.

Next, the backlight unit 24 will be explained. FIG. 3 illustrates the backlight unit 24 in a plan view. FIG. 4 illustrates the backlight unit 24 in a cross-sectional view taken along the horizontal direction (the x-axis direction). As illustrated in FIG. 2, the backlight unit 24 includes a chassis 22, an optical member 18, and a frame 14. The chassis 22 has a box-like shape having an opening on a front side (a light exit side, the liquid crystal panel 16 side). The optical member 18 is arranged on the front side of the chassis 22 so as to cover the opening thereof. The frame 14 has a frame-like shape and holds the liquid crystal panel 16 along inner peripheral edges of the frame 14.

The chassis 22 houses a plurality of point-like LED (Light Emitting Diode) light sources 28, an LED board 30 on which the LED light sources 28 are arranged (see FIG. 4), and a reflection member 26. As illustrated in FIG. 3, the LED light sources 28 are arranged in a matrix in a plan view. Namely, the LED light sources 28 are arranged along the horizontal direction and along the vertical direction. In the backlight unit 24, a light exit side is a side closer to the optical member 18 than the LED board 30. The backlight unit 24 directly supplies light to the liquid crystal panel 16 from a rear side of the liquid crystal panel 16 though the optical member 18.

The chassis 22 is made of metal such as an aluminum. The chassis 22 includes a bottom plate 22a, side plates 22c, and receiving plates 22d. The bottom plate 22a has a rectangular shape similar to the liquid crystal panel 16. The bottom plate 22a is arranged on the rear side of the LED board 30, i.e., on the side opposite to the light exit side of the LED light source 28. The side plates 22c rise from respective outer edges of the bottom plate 22a. The receiving plates 22d outwardly extend from rising edges of each of the side plates 22c. An overall shape of the chassis 22 is formed in a shallow box-like shape (shallow tray-like shape) opened to the front side. The frame 14 and the optical member 18 can be placed on the receiving plates 22d of the chassis 22 from the front side. The frame 14 is fixed to each receiving plate 22d with screws. Long sides of the chassis 22 match the X-axis direction (the horizontal direction) and short sides thereof match the Y-axis direction (the vertical direction).

Then, the LED board 30 and the LED light sources 28 arranged on the LED board 30 will be explained. As illustrated in FIG. 4, the LED board 30 has a landscape rectangular plate-like shape similar to the bottom plate 22a of the chassis 22. The LED board 30 is arranged on the front side of the bottom plate 22a of the chassis 22 such that long sides of the LED board 30 match the X-axis direction and short sides thereof match the Y-axis direction. The LED board 30 has a size that can cover substantially the entire area of a surface 22z of the bottom plate 22a, specifically, most middle area of the surface 22z of the bottom plate 22a other than an outer peripheral area of the surface 22z of the bottom plate 22a.

As illustrated in FIG. 3, the LED light sources 28 are mounted on a surface 30a of the LED board 30. As illustrated in FIG. 3, the LED light sources 28 are arranged planarly on the LED board 30 along the X-axis direction and the Y-axis direction. The LED light sources 28 are arranged along the X-axis direction and the Y-axis direction at regular intervals. The LED light sources 28 are mutually connected by a wiring pattern (not illustrated) on the LED board 30. A power circuit board (not illustrated) attached on the rear side of the bottom plate 22a of the chassis 22 supplies driving power to the LED light sources 28.

The LED light sources 28 are configured to emit white light. The LED light sources 28 each may be configured by mounting a red LED chip, a green LED chip, and a blue LED chip (not illustrated) on its surface. Alternatively, the LED light sources 28 each may include a blue light emitting diode covered with a phosphor having a light emitting peak in a yellow range to emit white light. Alternatively, the LED light sources 28 each may include a blue light emitting diode covered with phosphors having a light emitting peak in a green range and in a red range to emit white light. Alternatively, the LED light sources 28 each may include a blue light emitting diode covered with a phosphor having a light emitting peak in a green range and a red light emitting diode. Alternatively, the LED light sources 28 each may include a blue light emitting diode, a green light emitting diode, and a red light emitting diode to emit white light. Alternatively, the LED light sources 28 each may include an ultraviolet light emitting diode and phosphors. Particularly, the LED light sources 28 may include an ultraviolet light emitting diode covered with phosphors each having a light emitting peak in a blue range, a green range, and a red range to emit white light.

Figure 5:
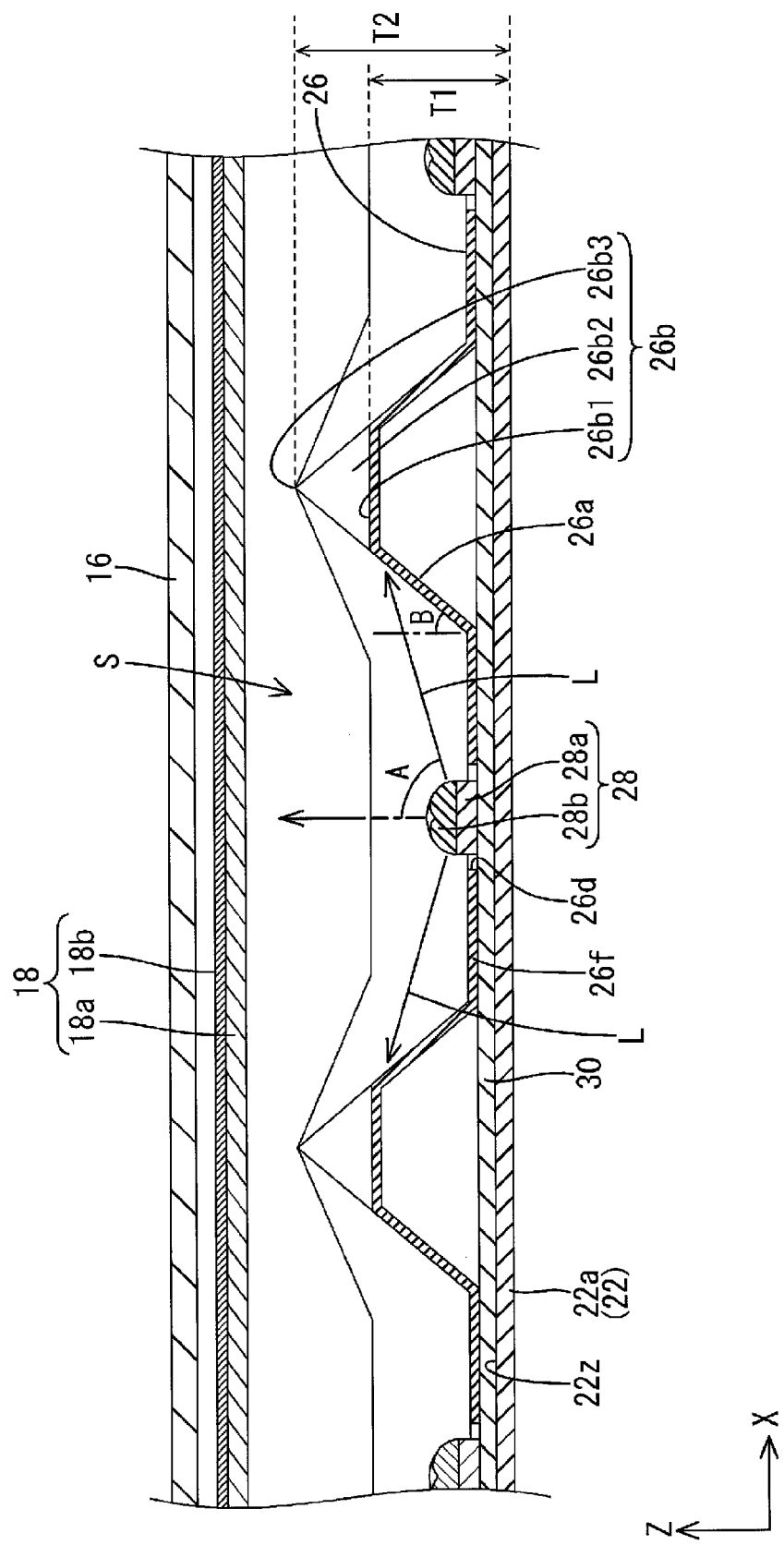
FIG. 5 is a magnified cross-sectional view of the backlight unit 24.

Next, a light intensity distribution of the LED light sources 28 will be described in detail. FIG. 5 is a magnified cross-sectional view illustrating the backlight unit 24 of FIG. 4. The reference character L indicates a traveling direction of rays of light having a peak light intensity among rays of light emitted from the LED light source 28. As illustrated in FIG. 6, each LED light source 28 is arranged on a surface of the LED board 30. The LED light source 28 includes a base portion 28a and a light output surface 28b covering the base portion 28a. The light is emitted from the base portion 28a. The light output surface 28b is transparent and has a hemispherical shape. Each of the LED light sources 28 has a light distribution in which light having the peak light intensity travels in a direction inclined with respect to a front direction of the LED light source 28. Herein, a specific unit of the light intensity includes a radiant intensity (W/sr·m2), a radiant flux (W), and irradiance (W/m2). Any other physical quantities relating to quantity of radiation may be used as the specific unit of the light intensity.

The light having the peak light intensity is radiated from a center of the LED 17 and travels in a direction L inclined at a predetermined angle A with respect to the front direction of the LED light source 28. Accordingly, the LED light source 28 diffuses light over a wide range. The reflection member 26 has inclined surfaces 26a. Each inclined surface 26a inclines at a predetermined angle B with respect to the front direction of the LED light source 28. The angle A is greater than the angle B in the backlight unit 24 (the angle A>the angle B). Therefore, the rays of light having the peak light intensity among the rays of light emitted from the LED light source 28 reach the inclined surfaces 26a. Thus, most of the rays of light emitted from the LED light sources 28 are directed in the front direction of the LED light source 28. Further, the inclined surface 26a that extend to a higher position can direct more rays of light toward the optical member 18 (the front direction of the LED light source 28).

Next, the reflection member 26 will be explained. The reflection member 26 is made of a thermoplastic synthetic resin. A front surface of the reflection member 26 has a white color that provides high light reflectivity. The reflection member 26 is arranged on the front side of the LED board 30 that is arranged on a front surface of the chassis 22. The reflection member 26 has a size that can cover substantially the entire area of the LED board 30. As illustrated in FIGS. 2 and 3, the reflection member 26 extends along the LED board 30 and includes side wall portions 26b, bottom portions 26f, four rising portions 26c, and four extended portions 26e.

Each side wall portion 26b rises toward the front side (the opening side of the chassis 22). The side wall portions 26b are arranged in a grid in a plan view such that the side wall portions 26b surround each of the LED light sources 28 arranged in a matrix. Among the LED light sources 28 arranged in a matrix, the side wall portion 26b located between every two adjacent LED light sources 28 that are positioned in a diagonal direction D1 (hereinafter, referred to as the side wall portions 26b in the diagonal direction D1) has a height T2. Among the LED light sources 28 arranged in a matrix, the side wall portions 26b located between every two adjacent LED light sources 28 that are positioned in a vertical direction D2 or in a horizontal direction D3 (hereinafter, referred to as the side wall portions 26b in the vertical direction D2 or the horizontal direction D3) has a height T1. The height T2 is greater than the height T1 (see FIG. 2 and FIG. 4). Each of the side wall portions 26b in the diagonal direction D1 has a tapered shape such that a tip end portion thereof is narrowed toward a center between every two adjacent LED light sources 28 that are positioned in the diagonal direction D1. The side wall portion 26b in the diagonal direction D1 includes inclined portions 26b2 and a tip end portion 26b3. The inclined portions 26b2 incline toward the tip end portion 26b3 that is located at the center of the two adjacent LED light sources 28 that are positioned in the diagonal direction D1. On the other hand, each of the vertical direction D2 side wall portions 26b and the horizontal direction D3 side wall portions 26b includes a flat portion 26b1 at its top end. The flat portion 26b1 is parallel to the bottom plate 22a of the chassis 22. The tip end portion 26b3 has a greatest height in the side wall portion 26b.

The bottom portion 26f is arranged along the LED board 30 and supported by the LED board 30. Each rising portion 26c rises from an outer peripheral edge of the bottom portion 26f. The rising portion 26c is inclined with respect to the bottom plate 22a of the chassis 22. Each extended portion 26e extends outwardly from an outer edge of each rising portion 26c. The extended portion 26e is placed on the respective receiving plate 22d of the chassis 22. Further, light source through holes 26d are formed in the bottom portion 26f of the reflection member 26 so as to correspond to the LED light sources 28 in a plan view, respectively. Each of the LED light sources 28 passes through each of the light source through holes 26d. The light source through holes 26d are formed along the X-axis direction and the Y-axis direction so as to correspond to the positions of the LED light sources 28. Each LED light source 28 that is passed through each light through hole 26d and exposed to the front side is surrounded by the side wall portions 26b.

Side surfaces of the side wall portion 26b are the inclined surfaces 26a. The inclined surfaces 26a incline from the LED board 30 toward the front side (the opening side of the chassis 22). Parts of the reflection member 26 except for edge portions of the light source through holes 26d and the bottom portion 26f project toward the front side to form the inclined surfaces 26a. The four inclined surfaces 26a are provided to form an inverted and truncated square pyramid shape so as to surround each of the LED light sources 28. The inclined surfaces 26a form square shapes as a whole in a plan view. The reflection member 26a formed in the above shape is excellent in shape-stability compared to a reflection member having inclined surfaces formed in an inverted conical shape so as to surround each LED light source 28. Further, the light that is emitted from each LED light source 28 and reaches each inclined surface 26a can be directed toward the front side (the opening side of the chassis) by the inclined surfaces 26a. The side wall portions 26b in the diagonal direction D1 have the height greater than the side wall portions 26b in the vertical direction D2 or the horizontal direction D3 as described above. Namely, the inclined surfaces 26a of the side wall portions 26b in the diagonal direction D1 extend to a higher position than the inclined surfaces 26a of the side wall portions 26b in the vertical direction D2 or the horizontal direction D3.

The side wall portions 26b project toward the optical member 18 having a predetermined space S between the projected ends and the optical member 18. The side wall portions 26b are not in contact with the optical member 18. The space S enables the light emitted from adjacent the LED light sources 28, which are surrounded by the inclined surfaces 26a, to travel each other.

The optical member 18 arranged on the opening side of the chassis 22 will be explained. The optical member 18 is placed on the receiving plate 22d of the chassis with the extended portion 26e of the reflection member 26 therebetween. The optical member 18 is arranged parallel to the LED board 30 and covers the opening of the chassis 22. The diffuser plate 18a of the optical members 18 includes a synthetic resin plate with light scattering particles dispersed therein. The diffuser plate 18a has a function of diffusing point light emitted by the LED light sources 28, which are dot-like light sources. The diffuser plate 18a also has a light reflection function of reflecting light emitted by the LED light sources 28. The optical sheets 18b include a diffuser sheet, a lens sheet, and a reflection-type polarizing plate layered in this sequence from the diffuser plate 18a side on the front side of the diffuser plate 18a. The optical sheets 18b have a function of converting light emitted by the LED light sources 28 and passed through the diffuser plate 18a into planer light. The liquid crystal panel 16 is arranged at the front of the optical sheets 18b. The optical sheets 18b are sandwiched between the diffuser plate 18a and the liquid crystal panel 16.

The operation of the backlight unit 24 in this embodiment will be described. If each of the LED light sources 28 arranged in the backlight unit 24 is lit, the light widely emitted from each LED light source 28 directly enters the optical member 18, or indirectly enters the optical member 18 after being reflected by the inclined surfaces 26a of the reflection member 26. The light receives an optical effect from the optical member 18 and exits from the front surface side of the optical member 18 toward the liquid crystal panel 16. Herein, the side wall portions 26b in the diagonal direction D1 extend to higher positions than the side wall portions 26b in the vertical direction D2 or the horizontal direction D3. Therefore, the side wall portions 26b in the diagonal direction D1 receive light more than the side wall portions 26b in the vertical direction D2 or the horizontal direction D3. As a result, more light is led to areas of a back side of the optical member 18 that overlap the side wall portions 26b in the diagonal direction D1. Then, the light is led to the liquid crystal panel 16. Thus, parts of a display surface of the liquid crystal panel 16 that overlap the side wall portions 26b in the diagonal direction D1 have brightness higher than parts of the display surface of the liquid crystal panel 16 that overlap the side wall portions 26b in the vertical direction D2 or the horizontal direction D3.

In the backlight unit 24 according to the above embodiment, the inclined surfaces 26a of the side wall portion 26b becomes higher, as the side wall portions 26b extend to higher positions. Accordingly, the inclined surfaces 26a of the side wall portions 26b located between the two adjacent LED light sources 28 that are positioned in the diagonal direction D1 extend to higher positions than the inclined surfaces 26a of the side wall portions 26b located between the two adjacent LED light sources 28 that are positioned in the vertical direction D2 or in the horizontal direction D3. Therefore, the amount of light reaching the inclined surfaces 26a of the side wall portions 26b in the diagonal direction D1 is greater than the amount of light reaching the inclined surfaces 26a of the side wall portions 26b in the vertical direction D2 or in the horizontal direction D3. This relatively improves the brightness in parts of the display surface of the liquid crystal panel 16 that overlap areas between the two adjacent LED light sources 28 that are positioned in the diagonal direction D1, compared to the brightness in parts of the display surface that overlap areas between the two adjacent LED light sources 28 that are positioned in the vertical direction D2 or in the horizontal direction D3. Thus, the uneven brightness in the display surface of the liquid crystal panel 16 is less likely to be caused.

In the backlight unit 24 according to the above embodiment, unevenness in the brightness of the display surface of the liquid crystal panel 16 can be improved compared to a conventional backlight unit even if a distance between the LED light sources 28 and the optical member (liquid crystal panel 16) is reduced. Thus, a television device that is thin and has high brightness can be achieved.

In the backlight unit 24 according to the above embodiment, a top end of the side wall portion 26b in the diagonal direction D1 has the tapered shape such that the tip end portion thereof is narrowed toward the center between the two adjacent LED light sources 28 that are positioned in the diagonal direction D1 with a plan view of a plurality of LED light sources 28. Therefore, levels of brightness can be adjusted with high accuracy in the parts of the display surface of the liquid crystal panel 16 overlapping the areas between the two adjacent LED light sources 28 that are positioned in the diagonal direction D1. This enables the surface brightness of the liquid crystal panel 16 to be more even. Thus, the uneven brightness in the display surface of the liquid crystal panel 16 is less likely to be caused.

Further, in the backlight unit 24 according to the above embodiment, the side wall portion 26b in the vertical direction D2 or the horizontal direction D3 includes the flat portion 26b1 at the top end. The flat portion 26b1 is parallel to the bottom plate 22a of the chassis 22 with plan view of the plurality of LED light sources 28. With this configuration, light is not excessively directed toward the optical member 18 by the inclined surface 26a of the side wall portion 26b in the vertical direction D2 or the horizontal direction D3. This effectively restrains the brightness from becoming excessively high in the parts of the display surface of the liquid crystal panel 16 that overlap the area between the two adjacent LED light sources 28 that are positioned in the vertical direction D2 or in a horizontal direction D3. This achieves even brightness of the display surface of the liquid crystal panel 16, and the uneven brightness is less likely to be caused in the display surface of the liquid crystal panel 16.

In the backlight unit 24 according to the above embodiment, the optical member 18 through which light passes is arranged on the opening side of the chassis 22 such that the space S is provided between the top ends of the side wall portions of the reflection member 26 and the optical member 18. Accordingly, the optical member 18 can effectively diffuse the light directed toward the opening side of the chassis 22. This can enhance the brightness in the display surface of the liquid crystal panel 16.

In the backlight unit 24 according to the above embodiment, each of the LED light sources 28 has a light intensity distribution in which light having a peak light intensity travels in a direction inclined with respect to the front direction of the LED light source 28. This increases a light distribution angle of the light emitted from the LED light sources 28. Thus, the amount of light reaching the inclined surfaces 26b among the light emitted from the LED light sources 28 increases. This can enhance the brightness in the display surface of the liquid crystal panel 16.

In the backlight unit 24 according to the above embodiment, each inclined surface 26a of the reflection member 26 is inclined with respect to the front direction of the LED light source 28 at an angle smaller than an angle formed between the light having the peak light intensity and the front direction. With this configuration, the rays of light having the peak light intensity among the rays of light emitted from the LED light sources 28 reaches the inclined surfaces 26a of the reflection member 26. This can increase the amount of rays of light directed in the front direction of the LED light sources 28 among the rays of light emitted from the LED light sources 28. Thus, the brightness in the display surface of the liquid crystal panel 16 can be further enhanced.

In the backlight unit 24 according to the above embodiment, the reflection member 26 is in a shape such that the side wall portions 26b are formed in a grid to surround each of the LED light sources 28 with a plan view. Thus, the reflection member 26 is excellent in the shape-stability.

In the backlight unit 24 according to the above embodiment, the LED light sources 28 are arranged at regular intervals. This simplifies mounting work of the LED light sources 28 to the chassis 22.

In the backlight unit 24 according to the above embodiment, the side wall portions surrounding each of the LED light sources 28 are formed to be uniform in size. With this configuration, the reflection member 26 can be easily manufactured.

Second Embodiment

A second embodiment will be explained with reference to the drawings. FIG. 6 illustrates a backlight unit 124 according to the second embodiment in a plan view. The second embodiment differs from the first embodiment in the shape of a top end of side wall portion. Other structures are same as those of the first embodiment, and thus configurations, functions, and effects similar to those of the first embodiment will not be explained. In FIG. 6, members and portions indicated by the number obtained by adding 100 to the reference numerals in FIG. 3 are same as the members and the portions explained in the first embodiment.

As illustrated in FIG. 6, first flat portions 126b1 that are parallel to the bottom plate of the chassis are provided at top ends of side wall portions 126b in the vertical direction D2 or the horizontal direction D3 in the backlight unit 124 according to the second embodiment. Second flat portions 126b1 that are parallel to the bottom plate of the chassis are further provided at the top ends of the side wall portions 126b in the diagonal direction D1. A step is provided between the first flat portion 126b1 and the second flat portion 126b3 instead of providing an inclined portion. The side wall portion 126b in the diagonal direction D1 has a height (the height of the second flat portion 126b3) greater than the side wall portion 126b in the vertical direction D2 or the horizontal direction D3 (the height of the second flat portion 126b1). Even if the backlight unit 124 includes the reflection member 126 configured as described above, the brightness in parts of the display surface of the liquid crystal panel overlapping areas between the two adjacent LED light sources 128 that are positioned in the diagonal direction D1 can be improved, compared to parts of the display surface of the liquid crystal panel overlapping the areas between the two adjacent LED light sources 128 that are positioned in the vertical direction D2 or in the horizontal direction D3.

Third Embodiment

A third embodiment will be explained with reference to the drawings. FIG. 7 illustrates a backlight unit 224 according to the third embodiment in a plan view. The third embodiment differs from the first embodiment in the shape of a reflection member 226. Other structures are same as those of the first embodiment, and thus configurations, functions, and effects similar to those of the first embodiment will not be explained. In FIG. 7, members and portions indicated by the number obtained by adding 200 to the reference numerals in FIG. 3 are the same as the members and the portions explained in the first embodiment.

As illustrated in FIG. 7, in a backlight unit according to the third embodiment, a reflection member 226 includes inclined surfaces 226a each of which is formed in a conical shape and has a curved surface extending in its circumferential direction. The inclined surface 226a formed in a conical shape surrounds each of the LED light source 228. Side wall portions 126b in the vertical direction D2 or the horizontal direction D3 include first flat portions 226b1 at their top ends. Each of the first flat portions 26b1 is parallel to the bottom plate of the chassis. Side wall portions 226b in the diagonal direction D1 include second flat portions 226b3 at their top ends. Each of the second flat portions 226b3 is parallel to the bottom plate of the chassis. Inclined portions 226b2 that are inclined from the LED board to the front side are provided between the first flat portions 226b1 and the second flat portions 226b3 and connect the first flat portions 226b1 and the second flat portions 226b3. A height of each side wall portion 226b in the diagonal direction D1 (a height of the second flat portion 226b3) is greater than a height of each side wall portion 226b in the vertical direction D2 or the horizontal direction D3 (a height of the first flat portion 226b1). In the backlight unit 224 including the reflection member 226 configured as described above, the brightness in parts of the display surface of the liquid crystal panel overlapping areas between the two adjacent LED light sources 128 that are positioned in the diagonal direction D1 can be improved, compared to parts of the display surface of the liquid crystal panel overlapping areas between the two adjacent LED light sources 28 that are positioned in the vertical direction D2 or in the horizontal direction D3.

The configuration of the embodiments correspond to the configuration of the present invention as follows: the surface 22z of the bottom plate 22a is one example of "a first main surface"; the LED light source 28, 128, 228 is one example of "a light source"; light source through hole 26d, 126d, 226d is one example of "a through hole"; the surface 30a of the LED board 30 is one example of "a mounting surface"; the backlight unit 24, 124, 224 is one example of "a lighting unit", the flat portion 26b1, 126b1, 226b1 is one example of "a flat surface", and the space S is one example of "a space".

The above embodiments may include the following modifications.

(1) In the above embodiments, the top end of the side wall portion that is located between the two adjacent LED light sources that are positioned in the vertical direction or the horizontal direction is the flat portion. However, the flat portion may not be flat.

(2) In the above embodiments, the LED light sources are arranged at regular intervals. However, the LED light sources may not be arranged at regular intervals. In such a case, the angles of the inclined surfaces of the reflection member may be adjusted according to the intervals of the LED light sources. This decreases the number of the LED light sources and also lowers the mounting cost of the LED light sources.

(3) In the above embodiments, the LED light sources are arranged in rows and columns in the X-axis direction (along the long direction of the chassis) and the Y-axis direction (along the short direction of the chassis). However, the LED light sources may not be arranged in rows and columns along the X-axis direction and the Y-axis direction.

(4) The shape of the reflection member is not limited to the above embodiments, and may be suitably changed.

(5) In the above embodiments, the liquid crystal display device including the liquid crystal panel as a display panel is used. The technology can be applied to display devices including other types of display panels.

(6) In the above embodiments, the television device including the tuner is used. However, the technology can be applied to a display device without a tuner.

The embodiments of the present invention are explained in detail above for illustrative propose only, and it is to be understood that the claims are not limited by the forgoing description. The technology described in the claims includes the various modifications of the embodiments described above.

The technology components described in the description and the drawings are not required to be used in the combination described in the claims as originally filed. The technology components can show its technical utility when used either alone or in combination. In addition, the technology described in the above description and the drawings can achieve more than one object at the same time, and the technical utility of the technology can be recognized when the technology achieves one of the objects.

EXPLANATION OF SYMBOLS

TV: television device, Ca, Cb: cabinet, T: tuner, S: stand, 10: liquid crystal display device, 12: bezel, 14: frame, 16: liquid crystal panel, 18: optical member, 22, 122, 222: chassis, 24, 124, 224: backlight unit, 26, 126, 226: reflection member, 26a, 126a, 226a: inclined portion, 26b, 126b, 226b: side wall portion, 28, 128, 228: LED light source, 30, 130, 230: LED board.

The invention claimed is:

1. A lighting device comprising:
a chassis including a bottom plate and side plates, the bottom plate having peripheral end portions, and the side plates that rise from the peripheral end portions toward a first main surface side of the bottom plate, the chassis having an opening on the first main surface side;
a plurality of light sources arranged on the first main surface side of the bottom plate of the chassis in a matrix, the light sources configured to emit light toward an opening side of the chassis; and
a reflection member having side wall portions and a plurality of through holes through which the respective light sources are passed, the side wall portions surrounding each of the light sources,
each of the side wall portions having an inclined surface on a side surface thereof, the inclined surface being inclined from a surface on which the light sources are mounted toward the opening side of the chassis, and the inclined surface configured to direct light from the light sources toward the opening side of the chassis, and
the side wall portions being located between the light sources that are adjacently positioned in a diagonal direction having a height greater than a height of the side wall portions located between the light sources that are adjacently positioned in a vertical direction or in a horizontal direction with a plan view.

2. The lighting device according to claim 1, wherein the side wall portions located between the light sources that are adjacently positioned in the diagonal direction have top ends and the top ends are tapered so as to be narrower toward a center between the light sources that are adjacently positioned in the diagonal direction with a plan view.

3. The lighting device according to claim 1, wherein top ends of the side wall portions that are located between the light sources that are adjacently positioned in the vertical direction or in the horizontal direction are flat surfaces parallel to the bottom plate of the chassis with a plan view.

4. The lighting device according to claim 1, further comprising an optical member through which the light from the light sources passes and arranged on the opening side of the chassis such that a space is provided between the optical member and top ends of the side wall portions of the reflection member.

5. The lighting device according to claim 1, wherein each of the light sources has a light intensity distribution in which light having a peak light intensity travels in a direction inclined with respect to a front direction.

6. The lighting device according to claim 5, wherein the inclined surface of the reflection member is inclined with respect to the front direction of the light source at an angle smaller than an angle formed between the light having the peak light intensity and the front direction.

7. The lighting device according to claim 1, wherein the side wall portions of the reflection member surround each of the light sources separately in a grid in a plan view.

8. The lighting device according to claim 1, wherein the light sources are arranged at regular intervals.

9. The lighting device according to claim 1, wherein the side wall portions surround each of the light sources with a uniform area size.

10. A display device comprising:
a display panel configured to provide display using light from the lighting device according to claim 1.

11. The display device according to claim 9, wherein the display panel is a liquid crystal panel using liquid crystals.

12. A television device comprising the display device according to claim 10.

* * * * *